April 18, 1961  D. P. SKARIE  2,980,219
ACTUATING AND TORQUE-SUSTAINING STRUCTURE
FOR CLUTCHES AND BRAKES
Filed July 29, 1957  2 Sheets-Sheet 1

DONALD P. SKARIE
INVENTOR,

BY
ATTORNEY.

April 18, 1961

D. P. SKARIE 2,980,219

ACTUATING AND TORQUE-SUSTAINING STRUCTURE
FOR CLUTCHES AND BRAKES

Filed July 29, 1957

DONALD P. SKARIE
INVENTOR,

BY

ATTORNEY.

United States Patent Office 2,980,219
Patented Apr. 18, 1961

2,980,219

ACTUATING AND TORQUE-SUSTAINING STRUCTURE FOR CLUTCHES AND BRAKES

Donald P. Skarie, Hales Corners, Wis., assignor to Bucyrus-Erie Company, South Milwaukee, Wis., a corporation of Delaware Filed July 29, 1957, Ser. No. 674,793

5 Claims. (Cl. 192—85)

This invention relates to new and useful improvements in actuating and torque-sustaining structures for clutches and brakes.

Although useful in other relations, this invention may be employed to particular advantage in the control of power excavators, cranes and the like.

The principal object of this invention is to provide an improved pressure-fluid engaged clutch or brake having circumferentially-spaced friction-shoe assemblies in which smooth engagement with fine control of the shoe assemblies is accomplished without reducing torque-carrying capacity. This fine control of a power-actuated clutch or brake is employed to particular advantage in the control of the swing and hoist motions of a power excavator or crane in which fine control of clutching and braking without loss of full torque is desired.

Further objects are durability and simplicity and economy of construction, replacement and repair.

This invention consists in the novel parts, and in the combinatiton and arrangement thereof, which are defined in the appended claims, of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 1:
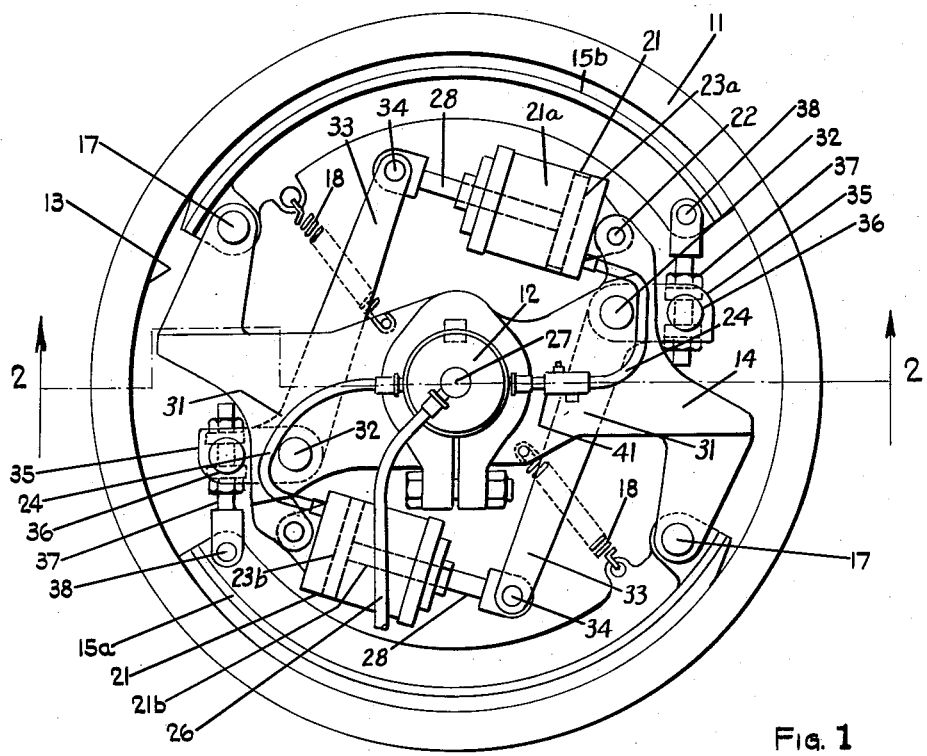
Figure 1 is a section, transverse to the axis of rotation of the drum of a clutch with the friction-shoe assemblies for engaging the drum shown in elevation.
Figure 2:
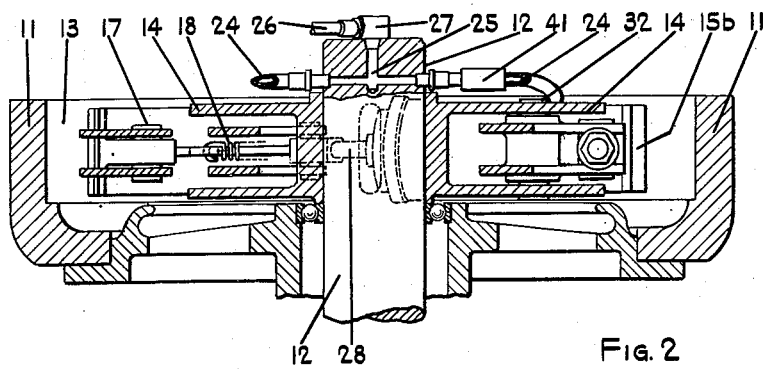
Figure 2 is a section of the same taken along the line 2—2 of Figure 1.
Figure 3:
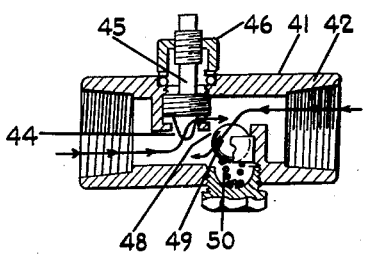
Figure 3 is an enlarged elevation, partly in section, of the flow control valve of Figure 1.

Referring now to Figures 1 to 3, the drum 11, constituting one of a pair of relatively rotatable structures, is journalled on a drive shaft 12, and has an annular frictional-engagement face 13 which is frictionally engaged by the actuating mechanism hereinafter described.

A rotatable mounting plate 14 secured on shaft 12 is the mounting for the assembly that includes the friction-wear shoes 15a, 15b and the actuating mechanism therefor, and constitutes the other one of the pair of relatively rotatable structures above mentioned.

Each of shoes 15a, 15b is mounted on mounting plate 14 in circumferentially-fixed position relative to said plate, as by being pivotally connected adjacent one of its ends to said mounting plate by pin 17. Spring 18 between each shoe 15a, 15b and the mounting plate 14 biases the shoe to remain normally disengaged from face 13. The shoes 15a, 15b are pivoted to rotate in the same direction (counter-clockwise in Figure 1) about their respective pivot axes for engagement with face 13, so that clockwise rotation of mounting plate 14 relative to drum 11 tends to engage the shoes with face 13, and counter-clockwise rotation of mounting plate 14 relative to drum 11 tends to disengage shoes 15a, 15b. Accordingly in this embodiment of the invention the shoes and their actuating mechanism act as a one-way clutch. The invention hereinafter described is equally applicable, however, to conventional clutches or brakes in which the shoes are adapted to move into engagement with frictional-engagement face 13 in such a manner that relative movement in either direction of the two relatively rotatable structures (i.e., the drum 11 and mounting plate 14) does not tend to engage or disengage the shoes.

Shoes 15a, 15b are actuated by a common actuating mechanism which includes for each shoe a cylinder-piston assembly 21 pivotally mounted at pivot 22 on mounting plate 14, and a conduit 24 through which pressure fluid enters the cylinder of said assembly to shift its piston to engage the shoe, as hereinafter described, the conduits 24 being interconnected and fed by a common bore 25 in drive shaft 12, which bore is fed with pressure fluid from a source of supply (not shown) by a pipe 26 connected with shaft 12 by a rotary sealing device 27.

The piston of each cylinder-piston assembly 21 has a piston rod 28 which is operatively connected to the swinging end of the corresponding shoe, preferably though not necessarily through a lever 31, which is fulcrumed at pivot 32 on mounting plate 14, and is interposed between the cylinder-piston assembly 21 and said shoe, for multiplying the force of the cylinder-piston assembly; the long arm 33 of lever 31 being pivotally connected at pivot 34 to the outer end of piston rod 28, and the short arm 35 of lever 31 being pivotally connected at pivot 36 to one end of a longitudinally adjustable screw-type link 37 which is pivotally connected at its other end by pivot 38 to the swinging end of the shoe.

In operation, shoes 15a, 15b are shifted into clutching engagement with friction-engagement face 13 of drum 11 when pressure fluid passes through pipe 26, bore 25 and conduits 24 into cylinders 21a, 21b, and shifts pistons 23a and 23b so as to rotate levers 31 counter-clockwise (Figure 1) about fulcrum pivots 32. In order to prevent the sudden engagement of both sides 15a, 15b, with accompanying sudden application of their full torque, the travel speed of one of the pistons 23a (hereinafter called the delayed action piston) is reduced, to delay the initial engagement of its corresponding shoe 15a, by interposing, in the conduit supplying said delayed action piston 23a, delayed action resistance means in the form of a flow control valve 41 that restricts the flow of fluid through the conduit into the cylinder 21a of said delayed action piston 23a, the restriction in said flow control valve being so proportioned with respect to the actuating force exerted by the common pressure-fluid actuating mechanism as to insure initial engagement of one shoe (15b) without effecting engagement of the other shoe (15a). In this manner the common pressure-fluid actuating mechanism for shoes 15a, 15b, effects sequential engagement of said shoes in a predetermined order.

Flow control valve 41 comprises a valve body 42 in the form of a conduit in which a needle valve and a one-way check valve are interposed in parallel relationship. The needle valve comprises a variable orifice 44 the flow through which in the controlled direction of shoe engagement is regulated by adjustment of a threaded needle 45 which is locked in the selected adjusted position on body 42 by locking nut 46. The check valve comprises a second orifice 48 that by-passes orifice 44 and blocks by means of floating ball 49 flow in the controlled direction (which is therefore regulated exclusively through the needle valve) but permits relatively free return flow (to disengage shoe 15) past ball 49 which is retracted on spring 50 by slight return fluid pressure. The needle valve is adjusted to slow down the flow of pressure fluid into cylinder 21a and retard engagement of shoe 15a to insure a gradual sequential application of torque first by shoe 15b and then by shoe 15a, until full torque is applied by engagement of both shoes under uniform pressure fluid.

Figure 4:
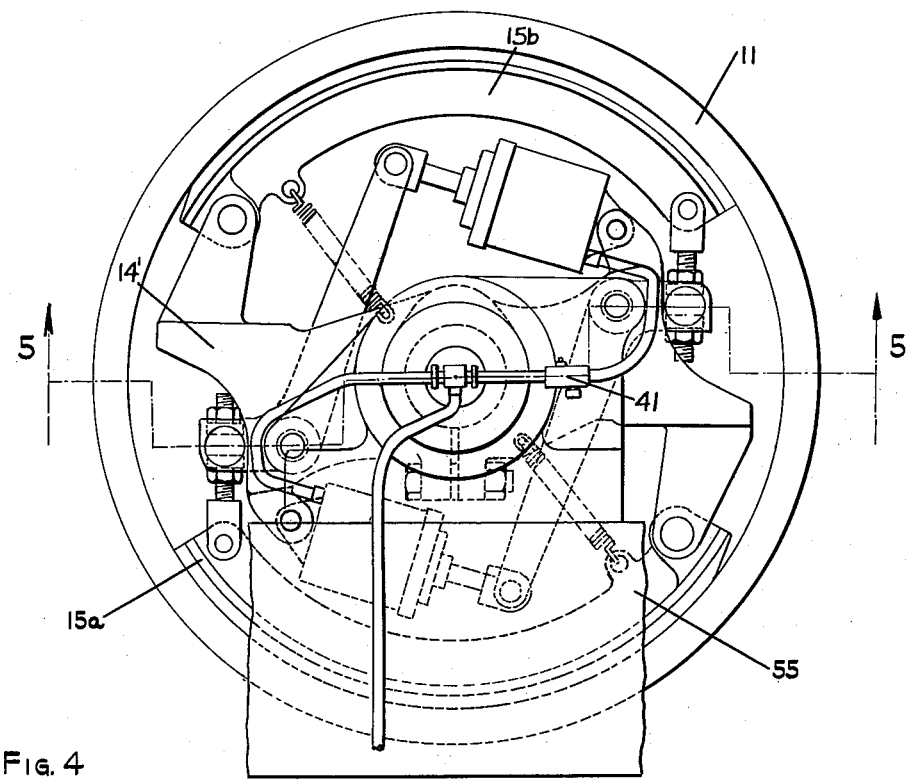
Figure 4 is a section, similar to Figure 1, of the second embodiment of the invention, showing the present invention applied to a brake.
Figure 5:
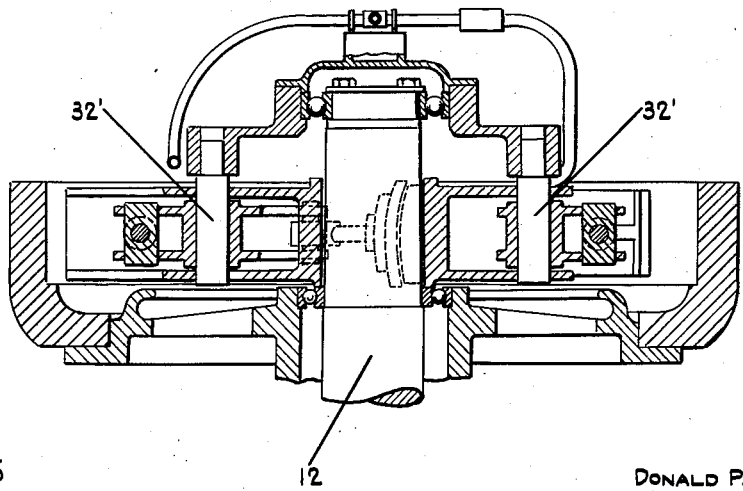
Figure 5 is a section taken along the line 5—5 of Figure 4.

Referring now to Figures 4 and 5, the present invention is shown therein applied to a brake (instead of a clutch), the mounting plate 14' being secured to a stationary frame 55 (instead of to the rotating shaft 12). Engagement of shoes 15a, 15b by the above-described actuating mechanism will accordingly brake drum 11 against rotation with respect to frame 55, such engagement being sequential by virtue of the retarding action on one shoe 15a of the flow control valve 41.

Having now described and illustrated two forms of the invention, it is to be understood that the invention is not to be limited to the specific form or arrangement of parts herein described and shown.

I claim:

1. An assembly of the character described comprising: two relatively rotatable structures adapted for frictional torque sustaining engagement with each other, one of said structures comprising a member having an annular frictional-engagement face, and the other of said structures comprising a mounting; a pair of friction shoes each pivoted adjacent one of its ends at a fixed position on said mounting for rotation of the shoes all in the same rotative direction about their respective pivot axes for engagement with said frictional-engagement face; a pressure-fluid actuator connected to each shoe adjacent the other end thereof for effecting engagement of the shoe; a common source of pressure fluid for said pressure-fluid actuators; and continuously open pressure-fluid flow-control means for restricting the flow of pressure-fluid from said common source to the pressure-fluid actuator of one of said shoes, such flow being so proportioned with respect to the flow of pressure-fluid from the common source to the pressure-fluid actuator of the other of said shoes that the last-mentioned shoe is initially engaged responsive to pressure fluid from the common source before engagement of said one of said shoes.

2. An assembly of the character described comprising: two relatively rotatable structures adapted for frictional torque-sustaining engagement with each other, one of said structures comprising a member having a frictional-engagement face, and the other of said structures comprising a mounting; a pair of friction shoes movably mounted on said mounting for movement into engagement with said frictional-engagement face; and common actuating means for effecting engagement of said shoes in predetermined order; said actuating means including resistance means offering resistance to engagement of one of said shoes so proportioned with respect to the actuating force exerted by said common actuating means for engagement of the other of said shoes as to insure initial engagement of the other of said shoes prior to effecting subsequent sequential engagement of said one of said shoes.

3. An assembly according to claim 2, further characterized by the fact that the common actuating means comprises a pressure-fluid actuator connected to each shoe for effecting engagement of the shoe; a common pressure-fluid source for said pressure-fluid actuators; conduits connecting said pressure-fluid source to each of said pressure-fluid actuators; and continuously open resistance means interposed in one of said conduits offering resistance to the flow of fluid to the pressure-fluid actuator of one of said shoes so proportioned with respect to the fluid-pressure exerted by said common fluid-pressure source to engage the other of said shoes as to insure initial engagement of said other of said shoes prior to effecting subsequent sequential engagement of said one of said shoes.

4. An assembly according to claim 3, further characterized by having a bypass around said resistance means, and a check valve in said bypass to permit flow only in one direction through said bypass, said direction being such that return flow of pressure-fluid to disengage said one of the shoes is relatively unrestricted by said check valve.

5. An assembly of the character described comprising: two relatively rotatable structures adapted for frictional torque-sustaining engagement with each other, one of said structures comprising a member having a frictional-engagement face, and the other of said structures comprising a mounting; a pair of friction shoes movably mounted on said mounting for movement into engagement with said frictional-engagement face; a power-operated actuator connected to each shoe for effecting engagement of the shoe; a common power source for said actuators; and continuously open power-flow control means interposed between said common power source and one of said actuators to retard the flow of power thereto and thereby retard the actuation thereof and effect sequential engagement of said shoes.

References Cited in the file of this patent

UNITED STATES PATENTS

| | | |
|---|---|---|
| 595,190 | Miller | Dec. 7, 1897 |
| 2,166,804 | Dick | July 18, 1939 |
| 2,281,538 | Leichsenring | Apr. 28, 1942 |
| 2,352,969 | Parsons | July 4, 1944 |
| 2,371,937 | Weeks et al. | Mar. 20, 1945 |
| 2,481,020 | Justus | Sept. 6, 1949 |
| 2,725,122 | Thorne | Nov. 29, 1955 |
| 2,730,204 | Pratt | Jan. 10, 1956 |

FOREIGN PATENTS

| | | |
|---|---|---|
| 164,116 | Australia | July 15, 1955 |
| 565,243 | Austria | Dec. 10, 1932 |